United States Patent
Onyszkiewicz et al.

(10) Patent No.: US 6,910,693 B2
(45) Date of Patent: Jun. 28, 2005

(54) DRAW DOWN CHUCK

(75) Inventors: Edmund J. Onyszkiewicz, Shelby Township, MI (US); Frederick J. Pifko, Clinton Township, MI (US); Longine V. Morawski, Grosse Pointe Park, MI (US)

(73) Assignee: MP Tool & Engineering, Co., Roseville, MI (US)

( * ) Notice: Subject to any disclaimer, the term of this patent is extended or adjusted under 35 U.S.C. 154(b) by 92 days.

(21) Appl. No.: 10/346,564

(22) Filed: Jan. 17, 2003

(65) Prior Publication Data

US 2004/0140629 A1 Jul. 22, 2004

(51) Int. Cl.[7] .............................................. B23B 31/163
(52) U.S. Cl. ...................................... 279/106; 279/141
(58) Field of Search ............................. 279/35, 38, 39, 279/40, 106, 107, 109, 114, 141

(56) References Cited

U.S. PATENT DOCUMENTS

| | | | |
|---|---|---|---|
| 1,412,170 A | | 4/1922 | Dixon |
| 1,756,970 A | * | 5/1930 | Booth ........................ 279/108 |
| 1,881,905 A | * | 10/1932 | Page ........................... 279/106 |
| 2,885,212 A | * | 5/1959 | Garrison et al. ............ 279/106 |
| 2,893,744 A | * | 7/1959 | Anthony ...................... 279/123 |
| 2,931,274 A | * | 4/1960 | Williams ..................... 409/33 |
| 3,248,122 A | | 4/1966 | Roddy |
| 3,420,538 A | | 1/1969 | Benjamin et al. |
| 3,610,645 A | | 10/1971 | Roddy |
| 3,618,961 A | | 11/1971 | Kiwalle et al. |
| 4,121,848 A | | 10/1978 | Morawski |
| 4,215,605 A | | 8/1980 | Toth et al. |
| 4,316,614 A | | 2/1982 | Clopton |
| 4,616,538 A | | 10/1986 | Hessbruggen |
| 6,367,816 B1 | * | 4/2002 | Denzinger et al. .......... 279/141 |
| 6,394,467 B1 | * | 5/2002 | Oki et al. .................... 279/106 |

FOREIGN PATENT DOCUMENTS

| | | |
|---|---|---|
| JP | 6-328307 | 11/1994 |
| JP | 9-76106 | 3/1997 |

* cited by examiner

*Primary Examiner*—Daniel W. Howell
(74) *Attorney, Agent, or Firm*—Dickinson Wright PLLC

(57) ABSTRACT

A drawn down chuck for gripping the inner or outer diameter of a workpiece. The chuck includes rotatable jaws disposed in a chuck body. The rotatable jaws helically and then linearly retract into the chuck body to secure workpieces having a shaft and an enlarged offset such as a hub or flange proximate to the end of the shaft. Cam assemblies interact with the jaw rods to provide the helical and linear movement. The cam assemblies include a cam groove and a cam follower, wherein the cam groove has a linear and a helical segment. The cam follower is operatively engaged on the cam groove as the jaw rod moves between the extended and retracted position so that when the jaw rod is retracted it first moves helically and then axially.

14 Claims, 5 Drawing Sheets

DRAW DOWN CHUCK

BACKGROUND OF THE INVENTION

The present invention relates to a chuck for gripping workpieces and more particularly to a chuck suitable for gripping pieces having a shaft and an enlarged offset, such as a hub or flange, proximate the end of the shaft that is gripped by the chuck.

Draw down chucks are widely used to grip workpieces while machining or performing other operations. Chucks come in a variety of sizes to grip various sized workpieces. Typically, chucks have two to four jaws that move axially between an extended position and a retracted position. As the jaws retract, they axially move together to grip the outer or inner surface of a workpiece. Chucks that close and open only through axial movements of the jaws rods have difficulty in retaining or gripping workpieces with larger diameter hubs or flanges. Even if the chuck is designed to accept a workpiece having large diameter portions, the jaw rods need an extended length of travel to open wide enough to accept such a workpiece. Extended travel causes the jaw rods to have large unsupported areas that are susceptible to distortion or warping. For chucks that grip the inner diameter of a workpiece, extended travel is often not possible due to the configuration of the workpiece.

SUMMARY OF THE INVENTION

In view of the above, the present invention is directed to a draw down chuck for gripping the inner or outer diameter of a workpiece. The chuck includes rotatable jaws that allow workpieces having large diameter offsets such as a hub or a flange to be gripped Generally, the chuck includes a jaw body, jaw rod assemblies, a puller, and cam assemblies. The chuck body has bores for receiving the jaw rod assemblies and a puller cavity for receiving the puller. The puller cavity communicates with the bores and is operationally coupled to the jaw rod assemblies. As the puller is moved in the puller cavity, the jaw rod assemblies move between retracted and extended positions. A cam assembly controls the axial and helical movement of each jaw rod assembly as it moves between the retracted and extended positions. The cam assembly is shown to include a cam follower formed in or coupled to one of the chuck body or jaw rod while the other of the chuck body or jaw rod defines a cam groove. The cam groove has a linear segment and a helical segment to control the axial and helical movement of the jaw rod assemblies.

In operation, as the puller moves the jaw rod assembly from the retracted position to the extended position, the cam follower first engages the linear segment of the cam groove and then the helical segment to first move the jaw rod assembly axially and then helically within the bore. The jaw rods include jaws so that as the jaw rods extend axially and then helically, the jaws open enough to clear the portion or area of the workpiece to be gripped and then rotate enough to provide clearance for the offset portion of the workpiece. The workpiece is then inserted into the chuck generally in line with the chuck axis so that the offset portion of the workpiece rests between the jaws and the chuck body. The jaw rod assemblies then retract helically so that as they are pulled into the chuck body, the jaws rotate to an engagement position. Once the jaws are rotated to the engagement position relative to the workpiece, they are retracted axially into the chuck body until they securely grip the workpiece. To release the workpiece the jaws are moved axially to disengage from the workpiece and then rotated helically so that the jaws clear the offset portion as the workpiece is removed from the chuck.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
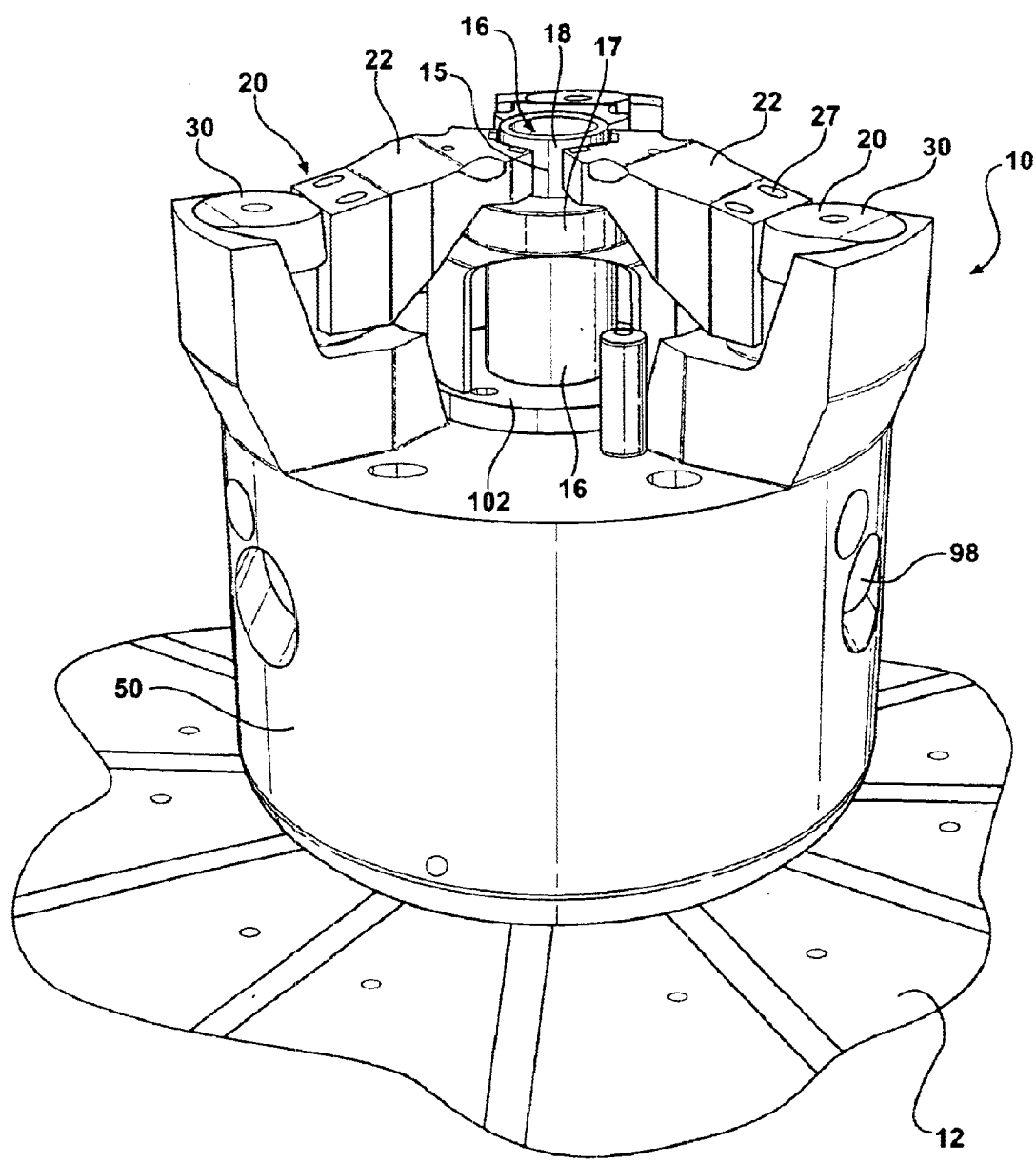
FIG. 1 is a perspective view of the chuck gripping a workpiece in a retracted position.
Figure 2:
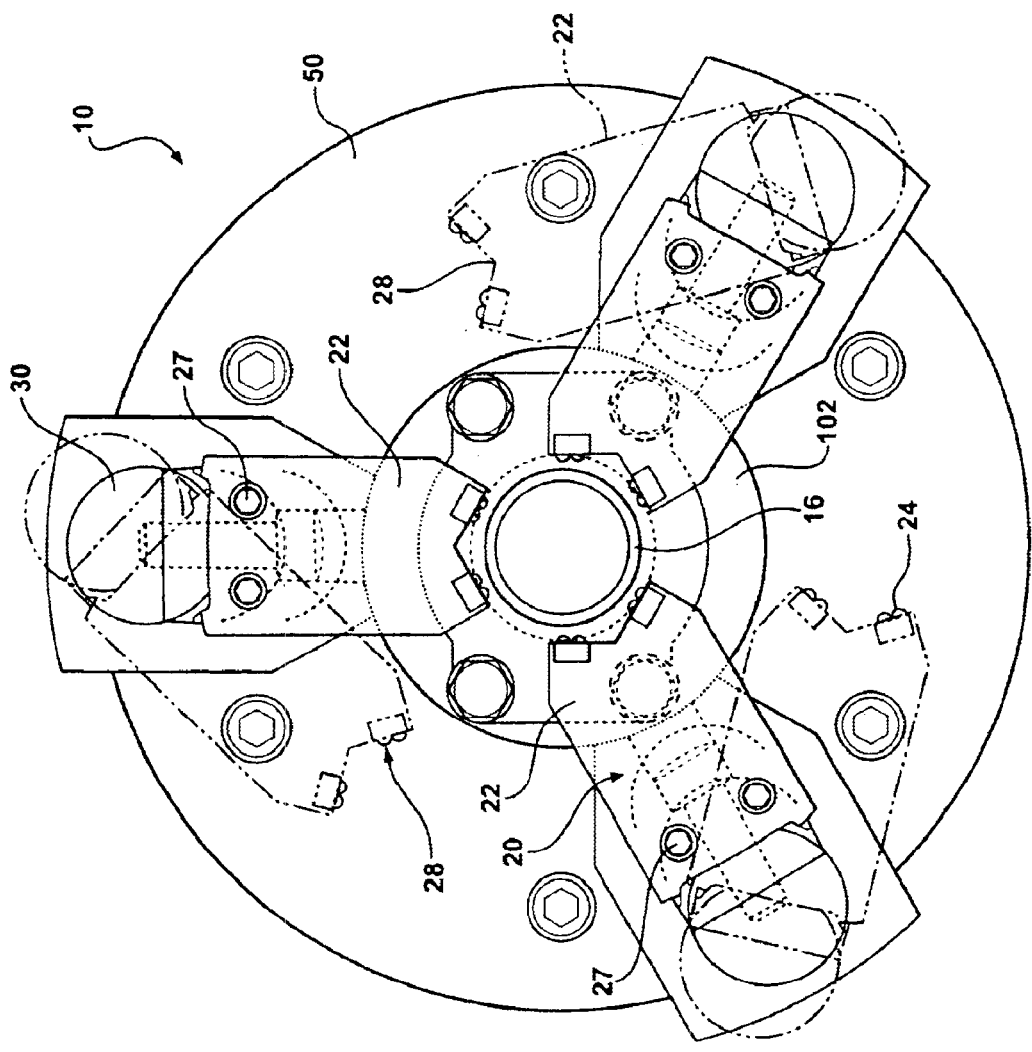
FIG. 2 is a top plan view of the chuck in an extended position.

FIG. 1 illustrates a chuck 10 for holding a workpiece for rotation about a chuck axis 14 The chuck 10 is attached to a spindle 12 and generally includes a chuck body 50, jaw rod assembly 20, cam assembly 70, and puller 110. The chuck body 50 holds and locates the jaw rod assembly 20, cam assembly 70, and puller 110 for operational movement. The jaw rod assembly 20 moves between a retracted position for engaging a workpiece 16 (FIG. 1) and an extended position for releasing the workpiece 16 (FIG. 2). In the extended position, the jaw rod assembly 20 is rotated away from the chuck axis 14 to allow a workpiece 16 with an outer radial surfaces 18 including a hub 17 or flange (not shown) to be securely retained by the chuck 10.

To retain a workpiece 16 with the chuck 10, the workpiece is placed in operative alignment with the chuck axis 14. The jaw assemblies 20 are then moved from the extended position to the retracted position during which they rotate to an engagement position relative to the workpiece 16 and then are linearly displaced along the chuck axis 14 to engage the workpiece 16. The jaw rod assemblies 20 are moved between the extended and retracted positions by the puller 110 while the cam assembly 70 controls the rotational and linear displacement of the jaw rod assemblies.

Figure 4:
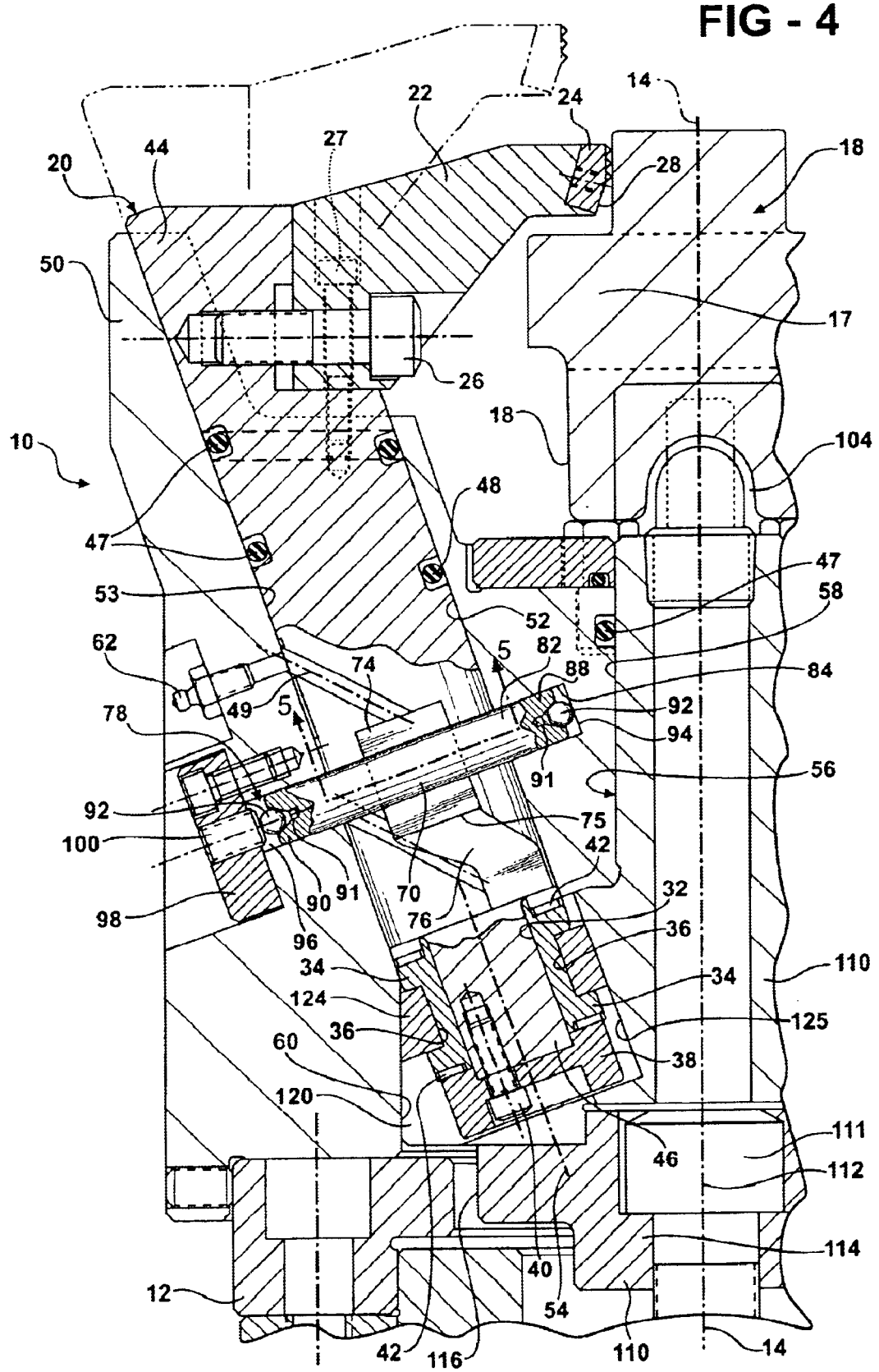
FIG. 4 is a partial sectional view of the chuck along line IV—IV in FIG. 1.

The jaw rod assemblies 20 include jaws 22 attached to jaw rods 30. The jaws 22 may be made in a variety of a sizes and shapes to engage different workpieces 16. As illustrated in FIG. 1, the jaws 22 may be formed with split jaw ends 28 to securely grip the workpiece 16 at an engagement area 15. The jaws 22 may also include replaceable jaw inserts 24 that contact the workpiece 16. The jaw insert 24 may be configured in a variety of sizes, shapes, and materials depending on the workpiece 16 to be gripped and the operations to be performed. As shown in FIG. 4, the jaws 22 may be releasably attached to the jaw rod 30 by a jaw attachment means 26, such as a bolt or pin. To ensure complete attachment of the jaws 22 to the jaw rods 30, a secondary jaw attachment means 27 may also be used.

Figure 3:
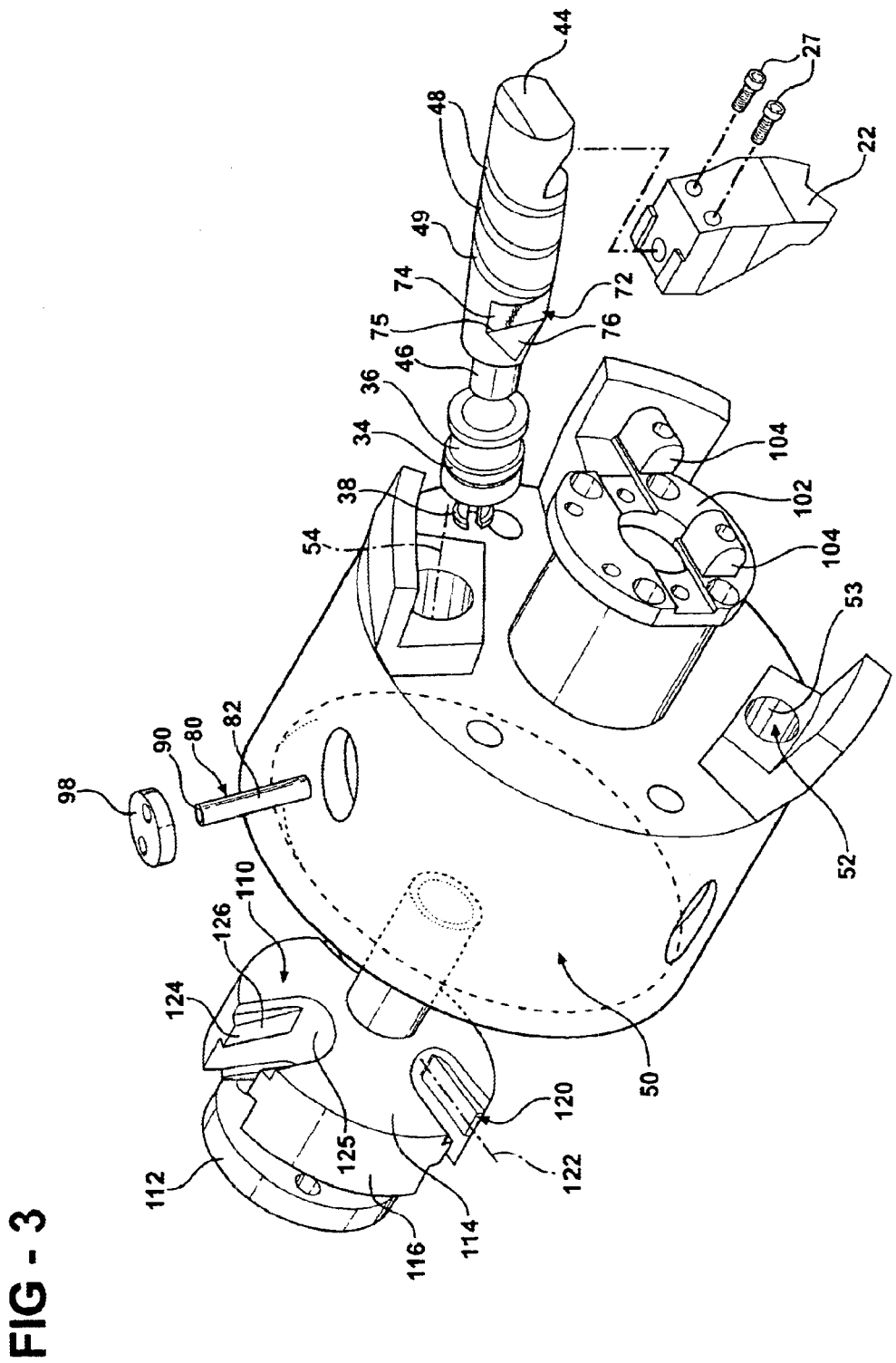
FIG. 3 is an exploded perspective view of the main components of the chuck.

The jaw rods 30 are best illustrated in FIGS. 3 and 4 and each jaw rod generally includes a first end 44, second end 46, sealing recess 48, and lubrication groove 49. The jaw rod 30 also includes a cam follower 80 or a cam groove 72, as will be discussed below in greater detail in relation to the cam assembly 70. The first end 44 of the jaw rod 30 is attached to the jaw 22, as described above. The second end 46 includes a radial recess 32 to receive a sleeve 34 for operational rotation as described below in greater detail. The sleeve 34 is inserted over the radial recess 32 with two thrust bearings 42 that allow the jaw rod 30 to rotate relative to the sleeve 34 as the jaw rod is extended and retracted. As shown in FIG. 4, an end cap 38 is attached to the second end 46 by an end cap fastener 40, such as the illustrated screw, to secure the sleeve 34 on the jaw rod 30. The sleeve 34 includes a coupling recess 36 to mate with the puller 110, as described below. The size and shape of the jaw rod 30 may depend on the application and size of the workpiece 16. The lubrication grooves 49 or pockets (not shown) facilitate the flow of lubrication to help ensure smooth movement of the jaw rod 30 within the chuck body 50. The sealing recesses 48 are shown to receive a seal 47, such as an O-ring, to prevent dirt, dust, machined materials, and other contaminants from entering the lubricated portions of the chuck 10.

The chuck body 50 is configured to receive and operationally couple the jaw rods 30, cam assembly 70, and puller 110. As illustrated in FIG. 3, the chuck body 50 generally includes bores 52 to receive the jaw rod assemblies 20, a puller cavity 56 to receive the puller 110, and a cam cavity 78 to receive the cam assembly 70. The number of bores 52 defined by the chuck body 50 is dependent on the application and number of jaws 22 desired to grip the workpiece 16. The chuck 10 is illustrated in FIG. 2 as having three jaws 22, but any number of jaws may be used, with the number of jaws depending on the size and shape of the workpiece 16. Although not shown, a single jaw chuck may be used where the jaw assembly 20 secures a workpiece 16 against a nest or receiver.

The bores 52 are angled relative to the chuck axis 14 so that the jaws 22 approach the chuck axis as the jaw rod assemblies 20 are retracted into the chuck body 50 allowing the jaws to securely engage the workpiece 16. The bores 52 include a bore axis 54 around which the jaw rod assemblies 20 rotate. The outer surface 53 of the bores 52 supports the jaw rod assemblies 20. The bores 52 intersect the puller cavity 56 and the cam cavity 78. Grease supports 62 may also be located on the chuck body 50 to provide lubrication to the jaw rod assembly. The grease support 62 generally allows grease to be added to the lubrication groove 49 on the jaw rod 30.

The puller cavity 56 is generally arranged along the chuck axis 14 although other configurations may be used. The puller cavity 56 generally includes an elongated bore 58 along the chuck axis 14 and a hub cavity 60, both being defined by the chuck body 50. The hub cavity 60 intersects with the bores 52. The puller cavity 56 may vary in size and shape but generally is shaped to match the profile of the puller 110.

Figure 5:
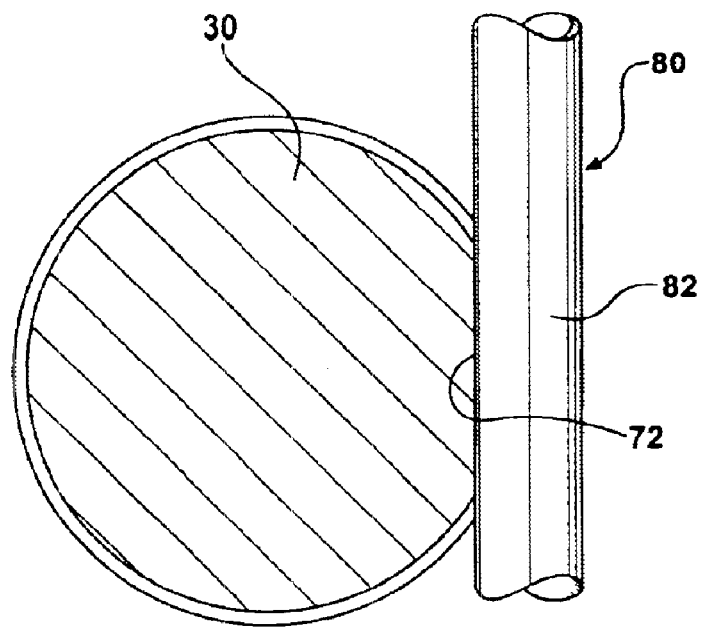
FIG. 5 is a sectional view of the cam follower and jaw rod along lines V—V in FIG. 4.

The cam assembly 70 includes a cam cavity 78 which may be defined by the jaw rod 30 or, as shown in FIGS. 4 and 5, the chuck body 50. In the illustrated embodiment, the cam cavity 78 communicates with the bore 52 so that when the cam follower 80 is disposed in the cavity 78 the follower operatively engages a cam groove 72 in the jaw rod 30. The cam cavity 78 further includes an outer radial surface 84, a first end 94, and a second end 96. An end cap 98 may be placed in the second end 96 to seal the cam follower 80 in the cam cavity 78, as illustrated in FIG. 4.

The puller 110 is slidable in the puller cavity 56 and includes a hollow central section 111, hub 114, puller end 118, and puller axis 112 (FIG. 3). The puller end 118 is configured for coupling to the spindle 12 so that the puller 110 may be moved along the puller axis 112. The hub 114 extends from the central section 111, both being arranged around the puller axis 112. The hub 114 includes an outer radial surface 116 from which key slots 120 extend inwardly. The key slots 120 include a slot axis 122 which extends towards the puller axis. In the illustrated embodiment, the slot axis 122 is perpendicular to the associated bore axis 54 and angled relative to the puller axis 112. The slots 120 also include a slot projection 124 along which the jaw rod assemblies 20 are slidably arranged. More specifically, the slot projections 124 have a linear portion 126 along which the sleeve 34 of the jaw assembly 20 may slide. It should be readily recognized that the slot projection 124 and coupling recess 36 may be interchanged so that the sleeve 34 projects into the key slot 120. The configuration of the slot 120 and the coupling recess 36 may be modified so long as the jaw rod assembly 20 is moved by the puller 110 and is free to slide in the key slot 120. The inner periphery of the slot projection 124 generally is circular as indicated at 125. The sleeve 34 in the jaw rod assembly 20 fits within the slot 120 to allow rotational movement of the jaw rod 22 as the puller 110 is moved along the puller axis 112. In the illustrated embodiment, the sleeve 34 does not rotate within the slot 120 but instead the jaw rod 22 rotates within the sleeve. Of course, the jaw rod 22, sleeve 34, and slot 170 can be configured so that the sleeve is stationary relative to the jaw rod, but rotates relative to the slot.

The cam assembly 70 controls the rotational movement of the jaw rod assemblies 20 and, as illustrated in FIG. 4, includes a cam groove 72 and a cam follower 80. In the illustrated embodiment, the cam groove 72 is defined by the jaw rod 30 and the cam follower 80 is illustrated as a pin 82. It should be appreciated that the illustrated embodiment may be varied, such as by fixing the cam follower to the jaw rod and defining the cam groove in the outer surface 53 of the bore 52, without departing from the spirit and scope of the invention. As shown in FIG. 4, the pin 82 is disposed in the cam cavity 78, extends into the bore 52, and is supported against loads by the outer radial surface 84 of the cam cavity 78. The pin 82 has a first end 88 and a second end 90 which each include an indentation 91 to receive cam bearings 92. The pin 82 may be sealed inside the cam cavity 78 by a pin cap 98 that includes a set screw 100 to adjust the location of the pin 82 and the tension on the pin 82 in the cavity 78.

Figure 6:
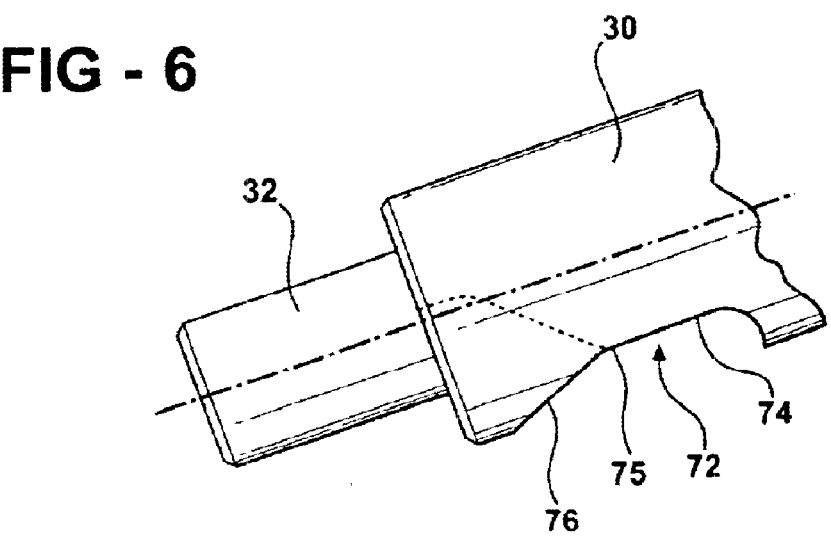
FIG. 6 is a perspective view of the cam groove.

The cam groove 72 is illustrated as having a linear segment 74, a helical segment 76, and a transition point 75 (FIG. 6). The segment 76 is referred to as a "helical" segment because the segment is configured to cause helical movement of the jaw rod when the follower 82 operatively engages the helical segment 76. It should be appreciated that the specific configuration of the helical segment may be varied, such as to achieve a desired rate of jaw rotation, without departing from the scope of the invention. For example, a workpiece 16 with a large offset 17 and a small engagement area 15 may require quick rotation of the jaw rod assemblies 20 to the engagement position and therefore a relatively large helical angle relative to the linear segment as compared to a workpiece 16 that has a larger engagement area or smaller offset. The helical segment may also consist of a single straight segment that is angled relative to the linear segment 74, multiple segments angled relative to one another, as well as single or multiple curved sections. The cam groove 72 may also have a variety of configurations for operatively engaging the cam follower 80. For example, while the cam groove 72 is illustrated as a chordal planar surface machined along the outer circumferential surface of the jaw rod 30, the cam groove 72 may be a slot extending radially inward from the outer surface of the jaw rod 30 with the follower pin 82, or suitable alternatives such as a metal ball or other projection, operably engaging the groove to control movement of the jaw rod 30. During operation of the chuck, the pin 82 rolls or slides along linear segment 74 and helical segment 76.

As illustrated in FIG. 6, the cam groove 72 is arranged with the linear segment 74 closest to the first end 44 of the jaw rod 30. By this configuration, when the jaw rod 30 is first moved from the retracted position, the cam follower moves within the linear segment 74 to non-rotationally displace the jaw rod within the bore 52. Further movement of the jaw rod moves the cam follower 80, e.g., pin 82, into operative engagement with the helical segment 76 to cause helical displacement of the jaw rod 30. For clarity, it is noted that helical movement of the jaw rod means that the jaw rod moves both axially and rotationally within the bore 52.

During chuck operation, the jaw rod assemblies are first placed in the extended position as shown in FIG. 2. In the extended position, the jaws 22 are rotated away from the chuck axis 14 to permit a workpiece 16, including a workpiece having an enlarged offset or flange 17, to be placed in operative alignment with the chuck 10. The jaw rod assemblies 20 are then moved from the extended position toward the retracted position through manipulation of the puller 110. As the jaw rod assemblies 20 move from the extended position to the retracted position, the cam follower first engages the helical segment 76 and the jaw rod assemblies is axially disposed and rotated. When the pin reaches the transition point 75, the jaws 22 are oriented in their engagement position facing the workpiece 16. As the jaw rods 22 are drawn further into the chuck body 50 by rearward displacement of the puller, the pin 82 moves into the linear segment 74 of the cam groove causing the jaw rod assemblies 20 to move without rotation into the chuck body 50. As the jaw rod assemblies 20 are drawn down into the chuck body 50, they engage the outer radial surface 18 of the workpiece 16 with the hub or flange 17 being located between the chuck body 50 and the jaws 22. Because the bore axis 14 is angled relative to the chuck axis 14, the jaw rod assemblies 20 are linearly drawn into the chuck body 50 so that the jaws 22 approach the workpiece 16 and secure the workpiece to the chuck 10 with a desired amount of force. The workpiece 16 may be placed against a plate 102 or a rough locator 104 to help center the workpiece before the jaws 22 engage the workpiece 16. After the workpiece 16 is securely retained by the chuck 10, the machining operation which may include milling, polishing, as well as a variety of other operations, may be performed.

Upon completion of the machining operation, the workpiece 16 is released from the chuck 10 by moving the jaw rod assemblies 20 from the retracted position to the extended position. As the jaw rod assemblies 20 move from the retracted position, they first move without rotation to disengage the radial surface of the workpiece 16. The angled orientation of the bore axis 54 relative to the chuck axis 14 allows linear disengagement. Further displacement of the jaw rod assemblies 20 toward the extended position causes the cam follower to operatively engage the helical segment 76 so as to displace the jaw rods 30 in a helical fashion and rotate the jaws 22 out of their engaged orientation. In this orientation, the workpiece may be removed from the chuck 10.

Even though the chuck 10 as described above and illustrated in FIGS. 1–3 has primarily been described with the jaws 22 engaging the outer surface 18 of a workpiece 16, it should be readily apparent to one skilled in the art that the chuck 10 with minor modifications may be used to grip the inner diameter of a workpiece. The modifications may include orienting the bores 52 to be angled toward the chuck axis 14 (as opposed to away from the chuck axis as shown in the drawings) and rotating the chuck jaws to face the chuck axis when the chuck jaws are out of their engaged orientation.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A chuck for holding a workpiece comprising;
   a chuck body having a chuck axis, a bore having a bore axis angled relative to said chuck axis, and a puller cavity communicating with said bore;
   a jaw rod assembly having a jaw rod disposed in said bore for movement along said bore axis between a retracted position and an extended position;
   a puller disposed for movement in said puller cavity and operatively coupled to said jaw rod assembly to displace said jaw rod along said bore axis, said jaw rod being coupled to said puller for rotation relative to said puller; and
   a cam assembly having a cain follower formed in or coupled to one of said chuck body and jaw rod and a cam groove, the other of said chuck body and jaw rod defining said cam groove, said earn groove having a linear segment and a helical segment, said cam follower operatively engaging said cain groove as said jaw rod moves along said bore axis to cause said jaw rod to first move axially and then helically within said bore when said jaw rod is moved from said retracted position toward said extended position, wherein said cam groove is a chordal planar surface.

2. The chuck of claim 1 wherein said jaw rod assembly further includes a jaw fixed to move with said jaw rod and facing said chuck axis when said cam follower operatively engages said linear segment of said cam groove.

3. The chuck of claim 1 wherein said cam follower is coupled to said chuck body and said jaw rod includes said cam groove.

4. The chuck of claim 3 wherein said chuck body includes a cam cavity communicating with said bore, and said cam follower is a pin disposed in said cam cavity.

5. A chuck for holding a workpiece comprising:
   a chuck body having a chuck axis, a bore having a bore axis angled relative to said chuck axis, a cam cavity communicating with said bore and perpendicular to said bore axis, and a puller cavity communicating with said bore;
   a jaw rod assembly having a jaw rod disposed in said bore for movement along said bore axis between a retracted position and an extended position;
   a puller disposed for movement in said puller cavity and operatively coupled to said jaw rod assembly to displace said jaw rod along said bore axis, said jaw rod being coupled to said puller for rotation relative to said puller; and a cam assembly including a pin disposed in said cam cavity and coupled to said chuck body and said jaw rod defining said cam groove, said cam groove having a linear segment and a helical segment, said pin operatively engaging said cam groove as said jaw rod moves along said bore axis to cause said jaw rod to first move axially and then helically within said bore when said jaw rod is moved from said retracted position toward said extended position and wherein said pin is cylindrical and includes an outer radial surface operatively engaging said cam groove, said pin being rotatable within said cam cavity.

6. The chuck of claim 5 wherein said cam cavity has a first side opening to said bore and a second side forming a continuous support surface for said pin.

7. The chuck of claim 5 wherein said cam cavity extends across said bore and includes first and second ends, wherein said cam assembly further includes a bearing disposed in said cam cavity at said first end and between said chuck body and said pin.

8. The chuck of claim 5 wherein said cam cavity extends across said bore and includes first and second ends, wherein said chuck body further includes an assembly cavity communicating with said second end of said cam cavity, wherein said cam assembly further includes an end cap disposed in said assembly cavity and fixed to said chuck body, said end cap closing said second end of said cain cavity.

9. The chuck of claim 8 wherein said end cap includes a set screw aligned with said pin to position said pin within said cam cavity.

10. A chuck and workpiece assembly comprising:

a workpiece;

a chuck having jaws coupling said workpiece to said chuck, said chuck including:
   a body having a puller cavity, a chuck axis and at least two bores each having bore axis angled relative each other, said puller cavity communicating with said bores;
   at least two jaw rods disposed in said bores and movable between a retracted position and an extended position along said bore axes, said jaws facing said chuck axis when said jaw rods are in said retracted position,
   a puller disposed for movement in said puller cavity, said puller being operatively coupled to said jaw rods to displace said jaw rods between said retracted position and said extended position;
   at least two cam assemblies, each cam assembly including a cam follower and a cam groove, said cam follower having an elongated outer radial surface engaging said cam groove, said cam follower being formed in or coupled to one of paid chuck body and jaw rod and said cam groove being defined by the other of said chuck body and jaw rod, said cam groove having a linear segment and a helical segment, said cam follower operatively engaging said cam groove as said jaw rod moves from said retracted to said extended positions.

11. The assembly of claim 10 wherein said workpiece has an outer diameter engaged by said jaws and wherein said jaws move away from said chuck axis when said jaw rod moves along said bore axis and said cam follower is operatively engaging said linear segment of said cam groove.

12. The assembly of claim 10 wherein said puller is positioned along said chuck axis and includes a hub defining at least two key slots extending away from said chuck axis, each of said key slots having a slot axis, said jaw rods disposed in said key slots, each of said jaw rods moving along said slot axis relative to said chuck axis as said puller is moved along said chuck axis.

13. The assembly of claim 12 wherein each of said jaw rods are movable along said slot axis relative to said puller when said jaw rod is moved along said bore axis and said cam follower is operatively engaging either of said linear and helical segments of said cam groove.

14. The assembly of claim 13 wherein paid jaws rotate away from said chuck axis as said jaw rods are moved from said retracted position to said extended position and said cam follower is operatively engaging said helical segment of said cam groove.

* * * * *

UNITED STATES PATENT AND TRADEMARK OFFICE
CERTIFICATE OF CORRECTION

PATENT NO. : 6,910,693 B2
DATED : June 28, 2005
INVENTOR(S) : Edmund J. Onyszkiewicz et al.

It is certified that error appears in the above-identified patent and that said Letters Patent is hereby corrected as shown below:

Title page,
Item [56], References Cited, U.S. PATENT DOCUMENTS, "1,881,905 A* 10/1932 Page" should be -- 1,881,905 A* 10/1932 Page et al. --.

Column 2,
Line 34, after "14" insert -- . --.

Column 6,
Line 24, ";" should be -- : --.
Lines 36 and 41, "cain" should be -- cam --.
Line 39, "earn" should be -- cam --.

Column 7,
Line 30, "cain" should be -- cam --.

Column 8,
Line 3, "," should be -- ; --.
Lines 12 and 36, "paid" should be -- said --.

Signed and Sealed this

Thirtieth Day of August, 2005

JON W. DUDAS
*Director of the United States Patent and Trademark Office*